United States Patent
Longman et al.

(10) Patent No.: US 12,384,404 B2
(45) Date of Patent: Aug. 12, 2025

(54) MOTION MONITOR USING LIDAR REGISTRATION

(71) Applicant: GM GLOBAL TECHNOLOGY OPERATIONS LLC, Detroit, MI (US)

(72) Inventors: Oren Longman, Tel Aviv (IL); Noam Zac, Kfar Saba (IL); Tal Furman, Tel Aviv (IL)

(73) Assignee: GM Global Technology Operations LLC, Detroit, MI (US)

( * ) Notice: Subject to any disclaimer, the term of this patent is extended or adjusted under 35 U.S.C. 154(b) by 593 days.

(21) Appl. No.: 17/569,973

(22) Filed: Jan. 6, 2022

(65) Prior Publication Data
US 2023/0211798 A1    Jul. 6, 2023

(51) Int. Cl.
| | |
|---|---|
| B60W 60/00 | (2020.01) |
| G01S 17/58 | (2006.01) |
| G01S 17/89 | (2020.01) |
| G06T 7/20 | (2017.01) |

(Continued)

(52) U.S. Cl.
CPC .......... *B60W 60/001* (2020.02); *G01S 17/58* (2013.01); *G01S 17/89* (2013.01); *G06T 7/20* (2013.01); *G06T 7/30* (2017.01); *G06T 7/70* (2017.01); *B60W 2420/403* (2013.01); *B60W 2420/408* (2024.01); *G06T 2207/30252* (2013.01)

(58) Field of Classification Search
None
See application file for complete search history.

(56) References Cited

U.S. PATENT DOCUMENTS

| | | | |
|---|---|---|---|
| 11,714,193 B1 * | 8/2023 | Foster | G01S 7/4808 |
| | | | 356/4.01 |
| 2008/0300787 A1 * | 12/2008 | Zeng | G01S 13/931 |
| | | | 701/301 |
| 2018/0341263 A1 * | 11/2018 | Rust | G01S 13/89 |

(Continued)

FOREIGN PATENT DOCUMENTS

| | | | |
|---|---|---|---|
| CN | 110618434 A | * | 12/2019 |
| CN | 113436238 A | * | 9/2021 |

(Continued)

OTHER PUBLICATIONS

Machine translation of CN-110618434-A (Year: 2019).*
Machine translation of CN-113436238-A (Year: 2021).*
Machine translation of WO-2021042286-A1 (Year: 2021).*

*Primary Examiner* — Anne Marie Antonucci
*Assistant Examiner* — Kyle S Park
(74) *Attorney, Agent, or Firm* — Quinn IP Law (57) ABSTRACT

A motion monitor includes a lidar device, a controller, and a circuit. The lidar device is configured to perform scans of an environment proximate the ego vehicle to generate lidar point clouds related to one or more objects in the environment. The controller is configured to transform the lidar point clouds with location transform matrices to generate location point sets, aggregate the location point sets in a duration of interest to generate aggregated point sets, register the location point sets to the aggregated point sets to generate correction transform matrices, update the location transform matrices with the correction transform matrices to generate updated location transform matrices, and generate motion sets based on the updated location transform matrices. The circuit is configured to receive the motion sets.

20 Claims, 5 Drawing Sheets

(51) Int. Cl.
*G06T 7/30* (2017.01)
*G06T 7/70* (2017.01)

(56) References Cited

U.S. PATENT DOCUMENTS

| | | | |
|---|---|---|---|
| 2019/0212416 A1* | 7/2019 | Li | G01S 17/931 |
| 2019/0219700 A1* | 7/2019 | Coombe | G01S 17/86 |
| 2019/0310378 A1* | 10/2019 | Ho | G01S 17/89 |
| 2020/0117947 A1 | 4/2020 | Mei | |
| 2021/0223776 A1* | 7/2021 | Viswanathan | G01S 17/42 |
| 2021/0312225 A1* | 10/2021 | Ku | G06V 20/56 |
| 2021/0323572 A1* | 10/2021 | He | G06V 20/56 |
| 2022/0234580 A1* | 7/2022 | Inaba | G08G 1/16 |
| 2022/0406014 A1* | 12/2022 | Ma | G01S 17/89 |
| 2023/0169780 A1* | 6/2023 | Sharma | G06V 20/584 |

FOREIGN PATENT DOCUMENTS

| | | | | |
|---|---|---|---|---|
| DE | 10258794 A1 | 6/2004 | | |
| DE | 102018112115 A1 | 11/2018 | | |
| WO | WO-2021042286 A1 * | 3/2021 | | G06T 17/05 |

* cited by examiner

MOTION MONITOR USING LIDAR REGISTRATION

INTRODUCTION

The present disclosure relates to a system and/or a method for motion monitoring of an ego vehicle, and in particular, motion estimation of the ego vehicle using lidar registration.

Ego vehicle motion estimation is used for advanced driver-assistance systems and automated vehicle features. The ego motion estimation is commonly achieved with a Global Positioning System (GPS) receiver, an inertial measurement unit (IMU), and/or a vehicle speed sensor (VSS) and/or a steering angle sensor. The GPS systems are susceptible to errors in urban environments and tunnels. The IMU systems are subject to drift. The VSS and the steering angle sensor have low accuracy. Both types of systems are costly. Lidar-based ego vehicle motion estimation approaches using scan-to-scan registration reduce costs over the GPS/IMU approaches, but have a low accuracy and are prone to drift.

Accordingly, those skilled in the art continue with research and development efforts in the field of ego vehicle motion estimation using lidar sensors.

SUMMARY

A motion monitor is provided herein. The motion monitor includes a lidar device, a controller, and a circuit. The lidar device is disposed in an ego vehicle and configured to perform a plurality of scans of an environment proximate the ego vehicle to generate a plurality of lidar point clouds related to one or more objects in the environment. The controller is in communication with the lidar device and configured to transform the plurality of lidar point clouds with a plurality of location transform matrices to generate a plurality of location point sets, aggregate the plurality of location point sets in a duration of interest to generate a plurality of aggregated point sets, register the plurality of location point sets to the plurality of aggregated point sets to generate a plurality of correction transform matrices, update the plurality of location transform matrices with the plurality of correction transform matrices to generate a plurality of updated location transform matrices, and generate a plurality of motion sets based on the plurality of updated location transform matrices. The circuit is in communication with the controller and configured to receive the plurality of motion sets.

In one or more embodiments of the motion monitor, the registration of the plurality of location point sets includes a non-causal registration that utilizes one or more future location point sets of the plurality of location point sets to noncausally register one or more current location point sets of the plurality of location point sets.

In one or more embodiments of the motion monitor, the registration of the plurality of location point sets is a causal registration that solely utilizes past location point sets of the plurality of location point sets to causally register each current location point set of the plurality of location point sets.

In one or more embodiments of the motion monitor, the aggregation of the plurality of location point sets includes identification of a number of aggregated points among the plurality of aggregated point sets that are within a neighborhood proximate each current location point in the plurality of location point sets, and removal of the neighborhood in response to the number of the aggregated points being less than a lower threshold number.

In one or more embodiments of the motion monitor, the aggregation of the plurality of location point sets further includes reduction of the neighborhood to a random sample of the aggregated points within the neighborhood in response to the number of the aggregated points exceeding an upper threshold value.

In one or more embodiments of the motion monitor, the aggregation of the plurality of location point sets further includes calculation of a singular value decomposition of the aggregated points in the neighborhood to determine a first singular vector, a first singular value, a second singular vector, a third singular vector, and a third singular value, where the first singular vector and the second singular vector define a best-fit plane to the aggregated points, and the third singular vector is normal to the best-fit plane, and filtering of the neighborhood in response to a ratio of the third singular value to the first singular value being greater than a ratio threshold value.

In one or more embodiments of the motion monitor, generation of the plurality of correction transform matrices is calculated using a least mean squares technique under a low angle correction assumption.

In one or more embodiments of the motion monitor, the circuit is a storage device configured to record the plurality of motion sets, and the plurality of motion sets form a training dataset for an autonomous driving training system.

In one or more embodiments of the motion monitor, the circuit is a drive system disposed in the ego vehicle, and is configured to control movement of the ego vehicle in response to the plurality of motion sets.

A method for motion estimation of an ego vehicle is provided herein. The method includes scanning an environment proximate the ego vehicle a plurality of times with a lidar device to generate a plurality of lidar point clouds related to one or more objects in the environment, transforming the plurality of lidar point clouds with a plurality of location transform matrices to generate a plurality of location point sets, aggregating the plurality of location point sets in a duration of interest to generate a plurality of aggregated point sets, registering the plurality of location point sets to the plurality of aggregated point sets to generate a plurality of correction transform matrices, updating the plurality of location transform matrices with the plurality of correction transform matrices to generate a plurality of updated location transform matrices, generating a plurality of motion sets based on the plurality of updated location transform matrices, and receiving the plurality of motion sets at a circuit.

In one or more embodiments of the method, the registering of each one of the plurality of location point sets includes a noncausal registering that utilizes one or more future location point sets of the plurality of location point sets to noncausally register one or more current location point sets of the plurality of location point sets.

In one or more embodiments of the method, the registering of each one of the plurality of location point sets includes a causal registering that solely utilizes past location point sets of the plurality of location point sets to causally register each current location point set of the plurality of location point sets.

In one or more embodiments of the method, the aggregating of the plurality of location point sets includes identifying a number of aggregated points of the plurality of aggregated point sets that are within a neighborhood of each current location point in the plurality of location point sets, and removing the neighborhood in response to the number of the aggregated points being less than a lower threshold number.

In one or more embodiments of the method, the aggregating of the plurality of location point sets further includes reducing the neighborhood to a random sample of the aggregated points within the neighborhood in response to the number of the aggregated points exceeding an upper threshold value.

In one or more embodiments of the method, the aggregating of the plurality of location point sets further includes calculating a singular value decomposition of the aggregated points in the neighborhood to determine a first singular vector, a first singular value, a second singular vector, a third singular vector, and a third singular value, where the first singular vector and the second singular vector define a best-fit plane to the aggregated points and the third singular vector is normal to the best-fit plane, and filtering the neighborhood in response to a ratio of the third singular value to the first singular value being greater than a ratio threshold value.

In one or more embodiments of the method, the generation of the plurality of correction transform matrices is calculated using a least mean squares technique under a low angle correction assumption.

An ego vehicle is provided herein. The ego vehicle includes a lidar device, a controller, a circuit, and a drive system. The lidar device is configured to perform a plurality of scans of an environment proximate the ego vehicle to generate a plurality of lidar point clouds related to one or more objects in the environment. The controller is in communication with the lidar device and is configured to transform the plurality of lidar point clouds with a plurality of location transform matrices to generate a plurality of location point sets, aggregate the plurality of location point sets in a duration of interest to generate a plurality of aggregated point sets, register the plurality of location point sets to the plurality of aggregated point sets to generate a plurality of correction transform matrices, update the plurality of location transform matrices with the plurality of correction transform matrices to generate a plurality of updated location transform matrices, and generate a plurality of motion sets based on the plurality of updated location transform matrices. The circuit is in communication with the controller, is configured to receive the plurality of motion sets, and generate a plurality of commands in response to the plurality of motion sets. The drive system is configured to control movement of the ego vehicle in response to the plurality of commands.

In one or more embodiments of the ego vehicle, the registering of the plurality of location point sets is a causal registering that solely utilizes past location point sets of the plurality of location point sets to causally register each current location point set of the plurality of location point sets.

In one or more embodiments, the ego vehicle further includes a camera configured to sense the environment proximate the ego vehicle to generate a plurality of images.

In one or more embodiments of the ego vehicle, the plurality of location transform matrices aligns the plurality of motion sets with the plurality of images.

The above features and advantages and other features and advantages of the present disclosure are readily apparent from the following detailed description of the best modes for carrying out the disclosure when taken in connection with the accompanying drawings.

DETAILED DESCRIPTION

Embodiments of the present disclosure provide a system and/or method for a lidar-based ego vehicle motion estimation. In various embodiments, the approach enables high ego vehicle motion accuracy by performing noncausal registration between the lidar device scans to aggregated scans before and after the current scan. The noncausal relationship means that the aggregated scans are not marked by cause and effect. Thus, the aggregated scans may be recorded during a trip and the noncausal registration of the current scans take place after the trip has been completed. By performing the process iteratively, estimation errors and drift errors are minimized, achieving high accuracy. In other embodiments, the registrations of the current scans may be performed in real time solely using past aggregated scans (e.g., causal registration).

The lidar device generally measures the environment around the ego vehicle at a constant interval, referred to as a scan. For real time approaches, scan-to-scan registration is used to produce real-time ego vehicle motion estimations suitable for real-time driver assistance. The ego motion estimation accuracy appropriate for a training dataset may be higher than the scan-to-scan registration approach may provide. Therefore, a non-real-time approach is provided for generating datasets suitable to train autonomous driving systems. The non-real-time approach uses the noncausal solution for offline implementation with improved accuracy that mitigates random walk errors, and further improves the registration process.

Figure 1:
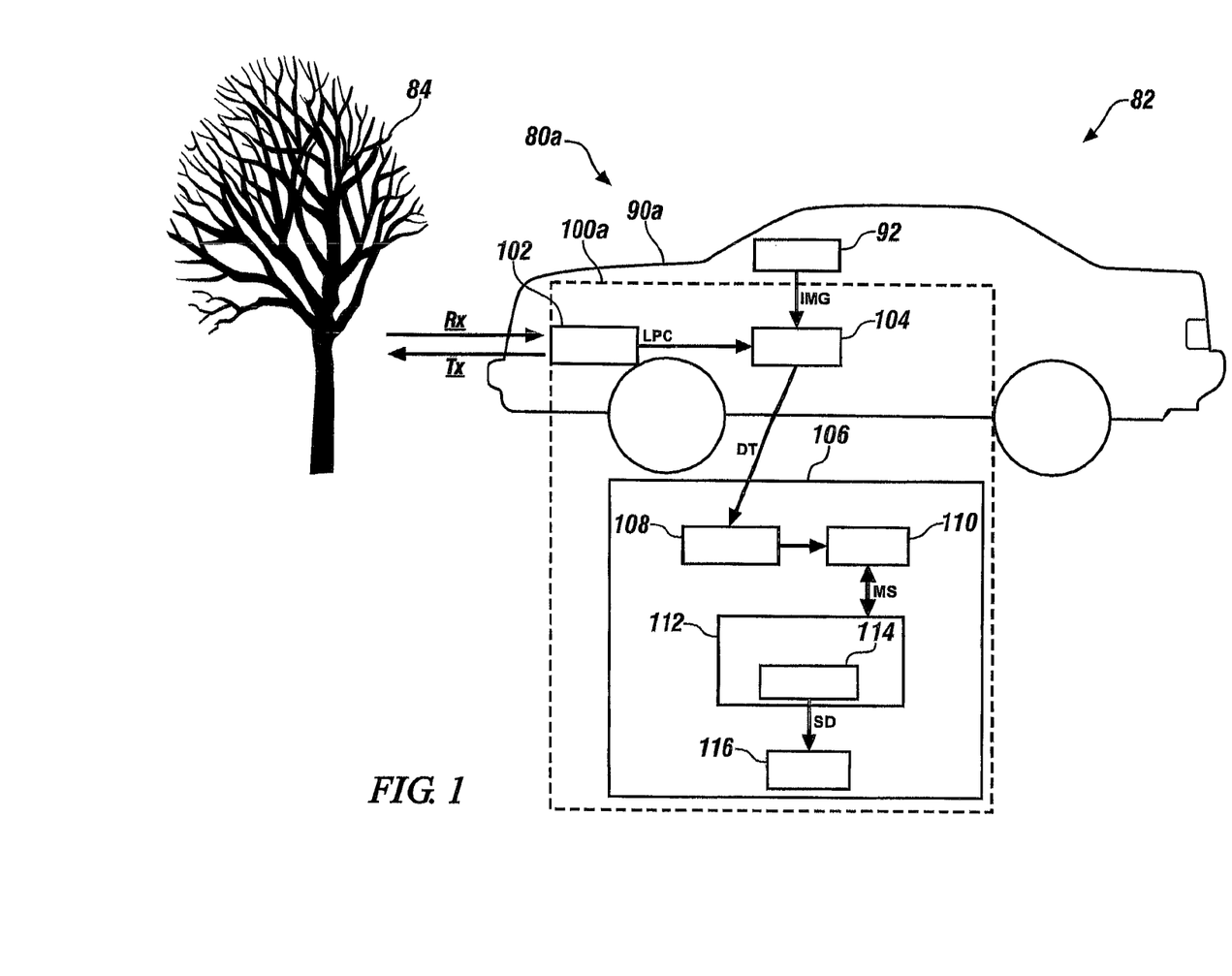
FIG. 1 is a schematic diagram illustrating a context of a system.

Referring to FIG. 1, a schematic diagram illustrating a context of a system 80a is shown. The system 80a may include an environment 82, one or more objects (one shown) 84, an ego vehicle 90a, and a navigation monitor 100a. The ego vehicle 90a generally includes one or more cameras (one shown) 92, a lidar device 102, and a transmitter 104. The navigation monitor 100a includes a receiver 108, a controller 110, a circuit 112, a storage device 114, and an autonomous driving training system 116. The ego vehicle 90a and the navigation monitor 100a are configured for recording and non-real-time (e.g., noncausal) analysis of the motion of the ego vehicle 90a.

A transmit signal (Tx) may be generated and presented by the lidar device 102. A receive signal (Rx) may be received by the lidar device 102. The receive signal Rx is the transmit signal Tx as reflected by the object 84. A lidar point cloud signal (LPC) is generally by the lidar device 102 and presented to the transmitter 104. The signal LPC conveys point clouds of the object 84 as measured by the lidar device 102. An image signal (IMG) is generated by the camera 92 and presented to the transmitter 104. The signal IMG transfers a sequence of visual images of the surrounding environment 82 as recorded by the camera 92.

A data signal (DT) is generated by the transmitter 104 and received by the receiver 108 and transferred to the controller 110. The signal DT is a wired or wireless signal that conveys the lidar point cloud data from the vehicle 90a to the navigation monitor 100a. A motion sets signal (MS) is generated by the controller 110 and presented to storage device 114 in the circuit 112. The signal MS carries sets of motion data derived from the lidar point cloud data. A stored data signal (SD) is generated by the storage device 114 and transferred to autonomous driving training system 116. The signal SD is the sets of motion data generated by the controller 110 and buffered in the storage device 114.

The objects 84 may include, but are not limited to, mobile objects (or targets) such as bicycles, carts, automobiles, trucks, motorcycles, boats, trains and/or aircraft. In some embodiments, the objects 84 may include stationary objects (or targets) such as signs, posts, buildings, mailboxes, lane markings, sidewalks, curbs, and/or walls. Other types of objects 84 capable of reflecting the signal Tx may be implemented to meet the design criteria of a particular application.

The ego vehicle 90a includes, but is not limited to, mobile vehicles (or objects) such as automobiles, trucks, motorcycles, boats, trains and/or aircraft. Other types of ego vehicles may be implemented to meet the design criteria of a particular application.

The camera 92 implements one or more optical cameras. The camera 92 is operational to capture images of the environment 82. The images (e.g., video) are presented in the signal IMG to the transmitter 104 for subsequent use by the autonomous driving training system 116.

The navigation monitor (or system) 100a implements a navigation measuring, recording, an analysis system. In various embodiments, the navigation monitor 100a is split between the ego vehicle 90a and the analysis system 106. The navigation monitor 100a is operational to repeatedly scan the environment 82 proximate the ego vehicle 90a with the lidar device 102 to generate the lidar point clouds related to the object(s) 84 in the environment 82. The navigation monitor 100a may also be operational to transform the lidar point clouds with multiple location transform matrices to generate multiple location point sets, aggregate the location point sets in a duration of interest to generate multiple aggregated point sets, and register the location point sets to the aggregated point sets to generate multiple correction transform matrices. The navigation monitor 100a may subsequently update the location transform matrices with the correction transform matrices to generate multiple updated location transform matrices, generate multiple motion sets based on the updated location transform matrices, and store the motion sets in the circuit 112 (e.g., in the storage device 114). From the circuit 112/storage device 114, the motion sets are used as a learning database by the autonomous driving training system 116.

The lidar device 102 implements a light detection and ranging device. The lidar device 102 uses pulsed laser waves to map the distance to the object 84 surrounding the ego vehicle 90a. The lidar device 102 is operational to measure distances to the object 84 to within a few centimeters, up to 60 meters away. In a first pass of the ego vehicle 90a through the environment 82, the lidar device 102 generate the lidar point clouds that accurately describe the environment 82 and the motion of the ego vehicle 90a. In the event that the ego vehicle 90a returns to the environment 82, the returning ego vehicle 90a can navigate the environment 82 in a predictable manner.

The transmitter 104 implements a wireless transmitter. The transmitter 104 is operational to transfer the lidar point cloud data from the lidar device 102 and the image data from the camera 92 to the analysis system 106.

The analysis system 106 implements one or more computers (or processors). The analysis system 106 is operational to record and analyze the lidar point cloud data and the image data received from the ego vehicle 90a to determine the motion of the ego vehicle 90a. The lidar point cloud data and the image data generally form a basis for an autonomous vehicle training dataset.

The receiver 108 implements a wireless receiver. The receiver 108 is operational to transfer the lidar point cloud data and the image data from the transmitter 104 to the controller 110.

The controller 110 implements one or more computers (or processors). The controller 110 is in communication with the receiver 108 and the circuit 112. The controller 110 is operational to transform the lidar point cloud data with the multiple location transform matrices to generate the multiple location point sets, aggregate the location point sets in a duration of interest to generate the aggregated point sets, register the location point sets to the aggregated point sets to generate the correction transform matrices, update the location transform matrices with the correction transform matrices to generate the updated location transform matrices, generate the motion sets based on the updated location transform matrices, and store the motion sets in the storage device 114.

The circuit 112 implements a processing circuit. The circuit 112 includes the storage device 114. The storage device 114 is operational to store the processed lidar cloud point data and the image data as received from the ego vehicle 90a for later use by the autonomous driving training system 116. The storage device 114 is in communication with the autonomous driving training system 116.

The autonomous driving training system 116 implements a training system for autonomous vehicles (e.g., the ego vehicle 90a). The autonomous driving training system 116 is operational to utilize the processed motion recorded for the ego vehicle 90a and the image data to teach autonomous vehicles how to react in various situations.

Figure 2:
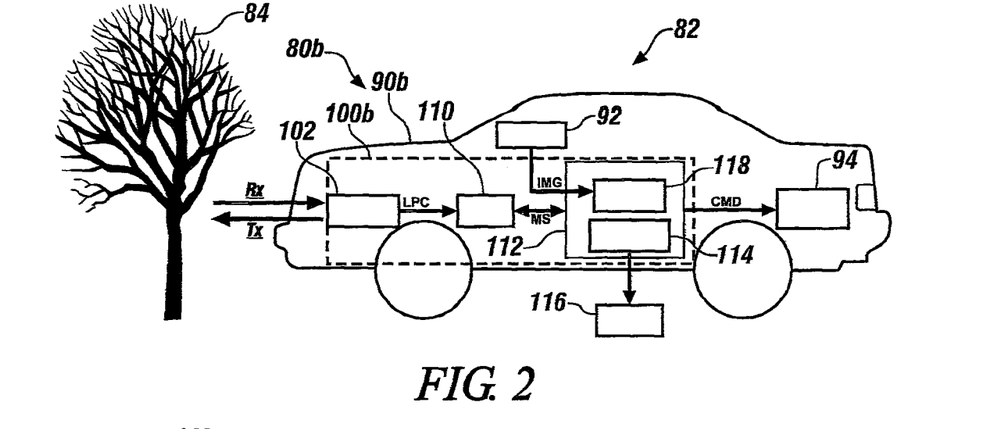
FIG. 2 is a schematic diagram illustrating an ego vehicle in another system in accordance with one or more exemplary embodiments.

Referring to FIG. 2, a schematic diagram illustrating another ego vehicle 90b in another system 80b is shown in accordance with one or more exemplary embodiments. The system 80b may include the environment 82, the object 84, the ego vehicle 90b, and a navigation monitor 100b. The ego vehicle 90b generally includes the camera 92, a power plant 94, and the navigation monitor 100b. A portion of the navigation monitor 100b on the ego vehicle 90b includes the lidar device 102, the controller 110, the circuit 112, the storage device 114, and driver system 118. An optional portion of the navigation monitor 100b external to the ego vehicle 90b includes the autonomous driving training system 116. The ego vehicle 90b and the navigation monitor 100b are configured for real-time (e.g., causal) recording and analysis of the motion of the ego vehicle 90a. The controller 110 is in communication with the lidar device 102 and the circuit 112.

A command signal (CMD) may be generated by the driver system 118 and presented to the power plant 94. The command signal CMD carries throttle, braking, gear selection, and/or steering commands generated by the driver system 118 to aid in control of the ego vehicle 90b.

The ego vehicle 90b is a variation of the ego vehicle 90a. The ego vehicle 90b is operational to use the causal registration of the lidar scans to the aggregate scans to aid in control of the ego vehicle 90b.

The power plant 94 implements a propulsion, braking, and steering system of the ego vehicle 90b. The power plant 94 is operational to provide power, gear selection, braking and/or steering controls in response to the command signal CMD.

The driver system 118 implements a driver assistance system. The driver system 118 is in communication with the power plant 94. The driver system 118 is operational to provide commands to the power plant 94 to assist the driver of the ego vehicle 90b with real-time control of the ego vehicle 90b.

The storage device 114 implements a removable and/or a downloadable device. The storage device 114 may communicate with the autonomous driving training system 116, where implemented. The processed lidar scans and/or image data may be transferred from the storage device 114 to the autonomous driving training system 116.

By implementing a causal registration of the lidar scans to the aggregated scans in the ego vehicle 90b, the navigation monitor 100b may determine real-time motion of the ego vehicle 90b. The real-time motion may include acceleration, speed, deceleration, and yaw of the ego vehicle 90b. The real-time motion may be provided to the driver system 118 to aid in control of the ego vehicle 90b.

Figure 3:
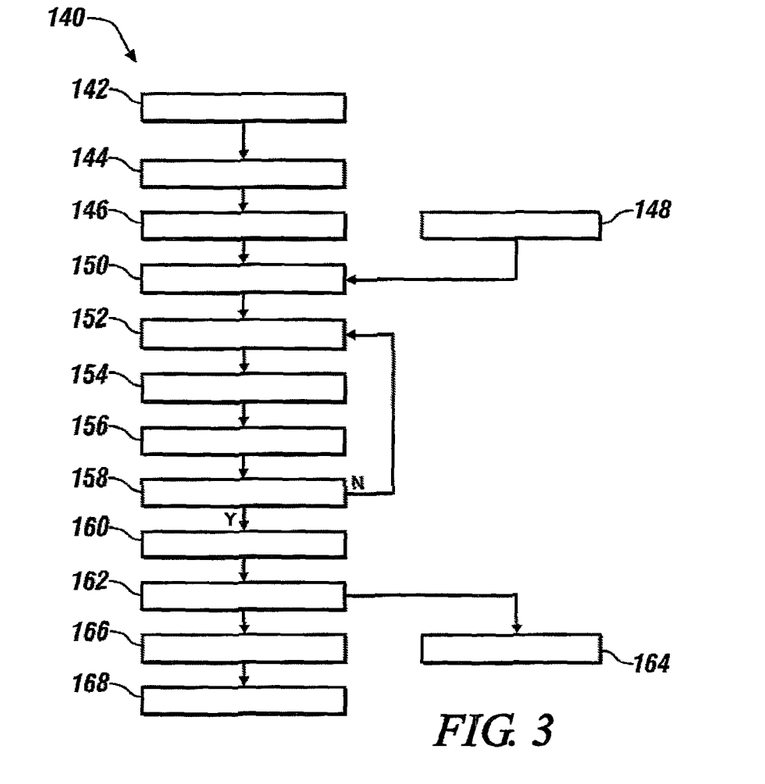
FIG. 3 is a flow diagram of a method for motion estimation of the ego vehicle in accordance with one or more exemplary embodiments.

Referring to FIG. 3, a flow diagram of an example implementation of method 140 for motion estimation of an ego vehicle is shown in accordance with one or more exemplary embodiments. The method (or process) 140 may be used for noncausal registration and causal registration embodiments. The method 140 generally includes steps 142 to 168, as shown. The sequence of steps is shown as a representative example. Other step orders may be implemented to meet the criteria of a particular application.

In the step 142, the lidar device 102 scans the environment 82 proximate the ego vehicle 90a/90b to generate the lidar point clouds related to the object(s) 84 in the environment 82. The camera 92 may generate the image data in the step 142. For the ego vehicle 90a, the transmitter 104 transfers the lidar point cloud data and the image data from the ego vehicle in the step 144. For the ego vehicle 90b, the storage device 114 records the aggregated lidar point cloud data and the image data for later subsequent driving assistance, and optional downloading to the autonomous driving training system 116.

In the step 146, the receiver 108 in the motion navigation monitor 100a receives the lidar data and the image data. The controller 110 in the navigation monitor 100b reads the aggregated lidar point cloud data and the image data from the storage device 114. In the step 148, the controller 110 reads initial location transform matrices from the storage device 114, or another available storage device. The transform matrices generally allow the lidar point cloud data to be changed from a local coordinate system into another coordinate system, such as the coordinate system of the image data from the camera 92. The lidar scans are transformed in the controller 110 with the location transform matrices to generate the location point sets in the step 150.

The location point steps are aggregated in a duration of interest by the controller 110 in the step 152 to create the aggregated point sets. The aggregated point sets are stored in the storage device 114. A current lidar scan (from the history of recorded lidar scans stored in the storage device 114 in the navigation monitor 100a, or from the lidar device 102 in the ego vehicle 90b) is obtained by the controller 110 in the step 154. The controller 110 registers the current lidar scan to the aggregated point sets as part of the step 154 to create the correction transform matrices. In the step 154, the controller 110 receives the aggregated scans and returns a correction of the location transform (Mk_opt) for each scan.

In the step 156, the controller 110 updates the location transform matrices with the correction transform matrices to generate updated location transform matrices. Each existing location transform (Lk_old) is updated according to the correction transform matrix Mk_opt, which is the output of the scan to aggregation registration process. The update may be performed according to equation 1 as follows:

$$Lk\_new = Mk\_opt \cdot Lk\_old \quad (1)$$

Where k is the scan index. The updating may utilize a least mean squares technique under a low angle correction assumption.

The steps 152-156 may be repeated a number of times to improve the accuracy of the data registration. A number of iterations through the steps 152 to 156 is checked in the step 158. If the number of iterations is less than a threshold value, the method 140 returns to the step 152 to register the current lidar scan to the updated aggregated data. Once the number of iterations reaches the threshold value, the method 140 continues with the step 160.

In the step 160, the controller 110 generates the motion sets based on the updated location transform matrices and the current lidar data. The motion sets may be transferred to the circuit 112 in the step 162. For the navigation monitor 100b, the motion sets may be consumed by the autonomous driving training system 116 to help control the ego vehicle 90b in the step 164. In various embodiments, the motion sets generated by the ego vehicle 90b may be stored in the storage device 114 for later transfer to the autonomous driving training system 116. For the navigation monitor 100a, the motion sets are stored in the storage device 114 for later transfer to the autonomous driving training system 116 in the step 166. In the step 168, the processed motion sets are aligned with the camera images for a clearer understanding of the environment 82 around the ego vehicle 90a when the ego vehicle 90a moved through the environment 82.

Figure 4:
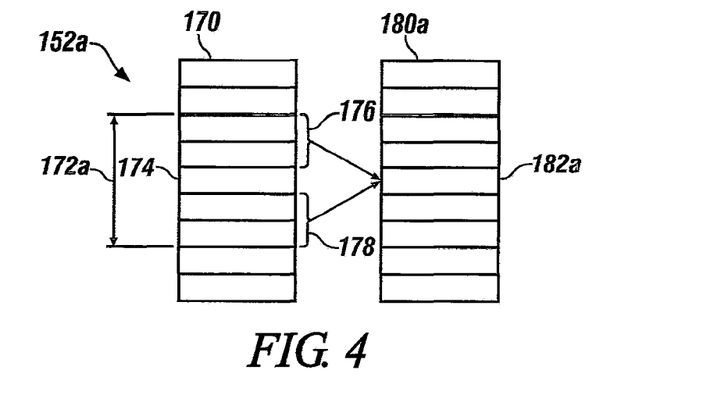
FIG. 4 is a schematic diagram of a noncausal aggregation in accordance with one or more exemplary embodiments.

Referring to FIG. 4, a schematic diagram of an example noncausal aggregation is shown in accordance with one or more exemplary embodiments. The noncausal aggregation 152a may be representative of the aggregation step 152 in the method 140. A list of location point sets 170 containing recorded location point sets (e.g., past location point sets, a current location point set, and one or more future location point sets) is stored in the storage device 114. A duration of interest 172a around a current location point set 174 is determined by the controller 110. The duration of interest 172a includes one or more future location point sets 176 and one or more past location point sets 178 temporally relative to the current location point set 174. Using the location point sets within the duration of interest 172a, not including the current location point set 174, the controller 110 calculates a noncausal aggregated point set 182a. The noncausal aggregated point set 182a is stored as part of a list of noncausal aggregate point sets 180a in the storage device 114. The calculation of the noncausal aggregate location point sets may be repeated for each current location point set 174 in the location point set 170.

Figure 5:
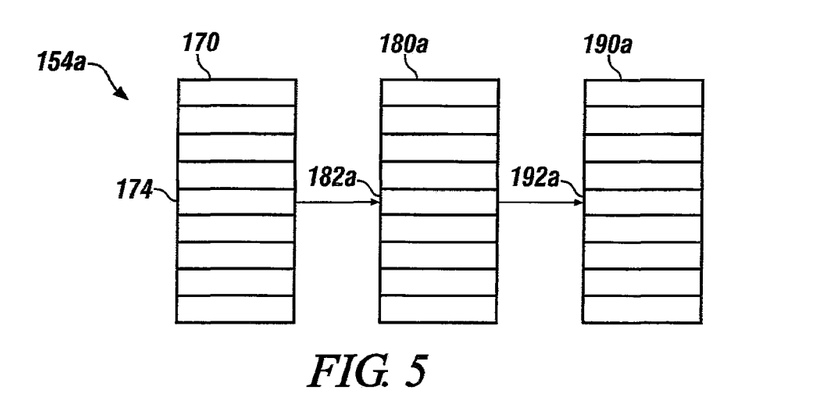
FIG. 5 is a schematic diagram of a noncausal registration in accordance with one or more exemplary embodiments.

Referring to FIG. 5, a schematic diagram of an example noncausal registration is shown in accordance with one or more exemplary embodiments. The noncausal registration 154a may be representative of the registration step 154 in the method 140. The controller 110 may register the current location point set 174 with a corresponding noncausal aggregated point set 182a from the list of noncausal aggregate point sets 180a. Discrepancies between the current location point set 174 and the corresponding noncausal aggregated point set 182a are used to determine a noncausal correction transform matrix 192a. The noncausal correction transform matrix 192a is stored in a list of noncausal correction transform matrices 190a. The registration is repeated with the location point sets in the list of location point sets 170 to populate the correction transform matrices in the list of noncausal correction transform matrices 190a.

Figure 6:
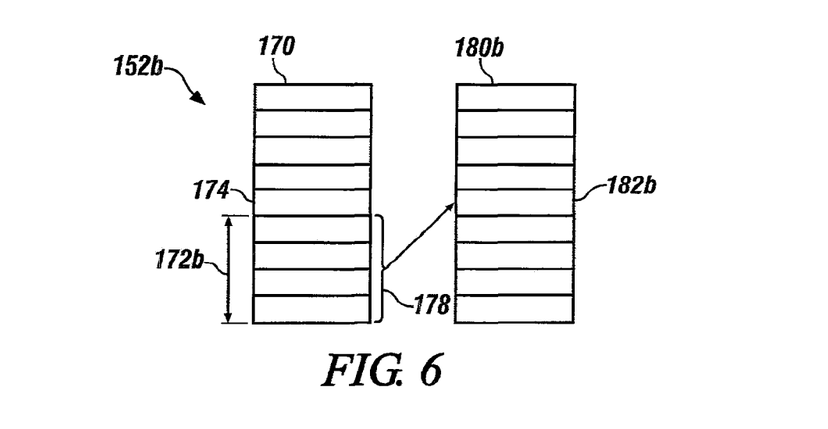
FIG. 6 is a schematic diagram of a causal aggregation in accordance with one or more exemplary embodiments.

Referring to FIG. 6, a schematic diagram of an example noncausal aggregation is shown in accordance with one or more exemplary embodiments. The noncausal aggregation 152b may be representative of the aggregation step 152 in the method 140. The list of location point sets 170 containing recorded location point sets (e.g., past location point sets, a current location point set, and possibly one or more future location point sets) is stored in the storage device 114. A duration of interest 172b before the current location point set 174 is determined by the controller 110. The duration of interest 172b includes multiple past location point sets 178 temporally relative to the current location point set 174. Using the location point sets within the duration of interest 172b, not including the current location point set 174, the controller 110 calculates a causal aggregate location point set 182b. The causal aggregated point set 182b is stored as part of a list of causal aggregate point sets 180b in the storage device 114. The calculation of the causal aggregate location point sets may be repeated for the location point sets 174 in the list of location point sets 170.

Figure 7:
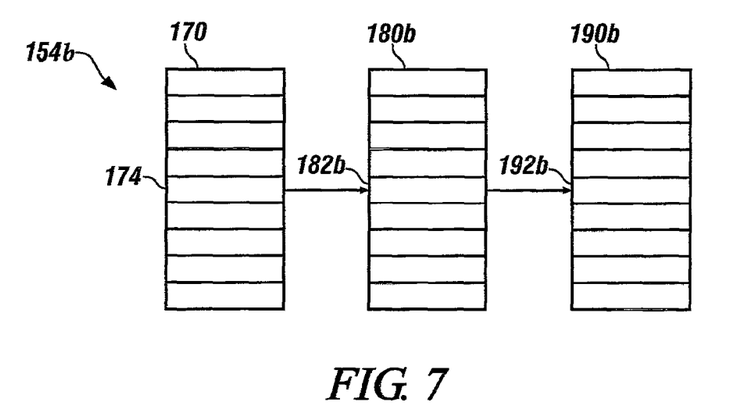
FIG. 7 is a schematic diagram of a causal registration is shown in accordance with one or more exemplary embodiments.

Referring to FIG. 7, a schematic diagram of an example causal registration is shown in accordance with one or more exemplary embodiments. The causal registration 154b may be representative of the registration step 154 in the method 140. The controller 110 may register the current location point set 174 with the corresponding causal aggregated point set 182b from a list of causal aggregate point sets 180b. Discrepancies between the current location point set 174 and the corresponding causal aggregated point set 182b are used to determine a causal current correction transform matrix 192b. The registration is repeated for each location point set in the list of location point sets 170 to populate the correction transform matrices in the list of causal correction transform matrices 190b.

Figure 8:
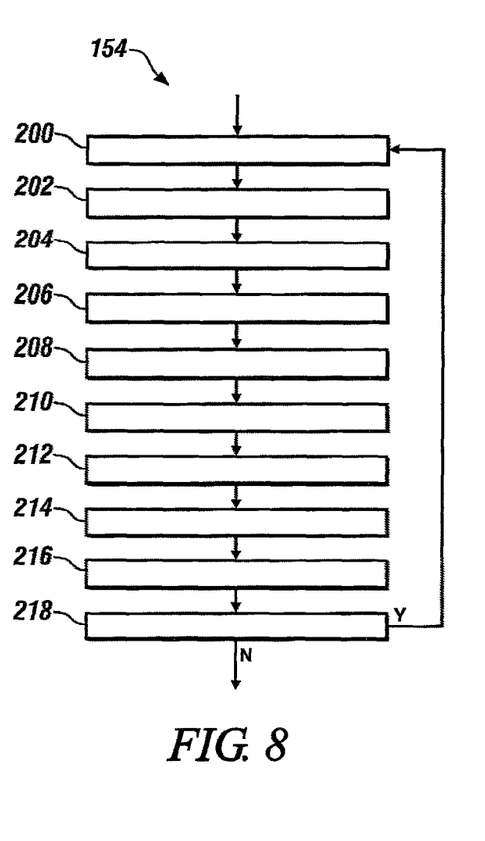
FIG. 8 is a flow diagram of the registration step in accordance with one or more exemplary embodiments.

Referring to FIG. 8, a flow diagram of an example implementation of the registration step 154 of the method 140 is shown in accordance with one or more exemplary embodiments. The step 154 includes steps 200 to 218, as illustrated. The sequence of steps is shown as a representative example. Other step orders may be implemented to meet the criteria of a particular application.

Each scan is registered with the aggregated scans, excluding itself. The registration is between each point in the scan to planes in the aggregation. In the step 200, the controller 110 selects a current scan that defines multiple location points around a current location point of interest. A number of location points are calculated in the step 202 to define a neighborhood around the current location point of interest. In the step 204, the controller 110 identifies a number of aggregated points that are within the neighborhood. If the number of the aggregated points is lower than a lower threshold number, the neighborhood is removed in the step 206. For a neighborhood with greater than the lower threshold number of the aggregated points, the controller 110 calculates a normal of the neighborhood in the step 208. The normal is a vector normal to a best-fit plane through the neighborhood. If the number of the aggregated points in the neighborhood is greater than an upper threshold value, the controller 110 randomly selects some aggregated points for further processing in the step 210.

In the step 212, the controller 110 calculates a singular value decomposition (SVD) of the aggregated points in the neighborhood after mean removal to determine a first singular vector, a first singular value, a second singular vector, a second singular value, a third singular vector, and a third singular value. The first singular vector and the second singular vector define the best-fit plane. The third singular vector is normal to the best-fit plane. The controller 110 subsequently filters the neighborhood in the step 214 in response to a ratio of the third singular value to the first singular value being greater than a ratio threshold value to remove one or more aggregate points. A correction transform matrix (Mopt) is calculated in the step 216 using a least mean squares technique under a low angle correction assumption. The calculation may be provided by equation 2 as follows:

$$Mopt = A^{-1}b \qquad (2)$$

Where $A = [n_y \cdot s_x - n_x \cdot s_y, \ n_x \cdot s_z - n_z \cdot s_x, \ n_z \cdot s_y - n_y \cdot s_z, n_x, n_y, n_z]$
$b_i = \Sigma(d_i - s_i) \cdot n_i, \ i \in \{x,y,z\}$ Where s is the scan points, d is the aggregation points and n is the normal.

The dimensions of s, d, and n are 3×N, where the first dimension is composed of (x,y,z) and N is the number of points. The calculation is performed for each scan.

In the step 218, if more scans are to be considered, the processing returns to the step 200 to select another current scan. Once the scans have been processed, the step 154 continues with the updating step 156 (FIG. 3).

Figure 9:
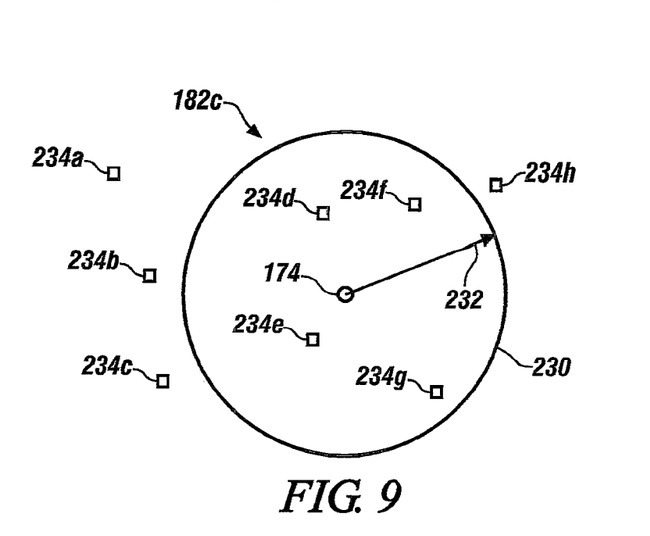
FIG. 9 is a schematic diagram of an aggregated point set in accordance with one or more exemplary embodiments.

Referring to FIG. 9, a schematic diagram of an example of an aggregated point set 182c is shown in accordance with one or more exemplary embodiments. The aggregated point set 182c is representative of the aggregated points sets in the list of noncausal aggregated point sets 182a and the list of causal aggregated point sets 182b.

The neighborhood 230 around the current location point 174 is defined as an area within a radius 232 extending from the current location point 174. Multiple aggregated points 234a-234h are scattered around inside and outside the neighborhood 230. For the purposes of the aggregation, the aggregated points 234d-234g within the neighborhood 230 are considered. If the number of the aggregated points 234d-234g is less than the lower threshold value, the neighborhood 230 is discarded per the step 206 in FIG. 8. Otherwise, the aggregated point set 182a/182b is generated from the aggregated points 234d-234g within each neighborhood 230 around each location point 174.

Figure 10:
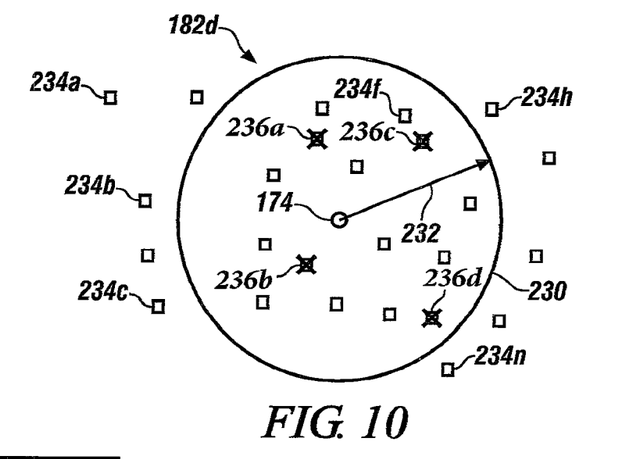
FIG. 10 is a schematic diagram of a crowed aggregated point set in accordance with one or more exemplary embodiments.

Referring to FIG. 10 a schematic diagram of an example of a crowed aggregated point set 182d is shown in accordance with one or more exemplary embodiments. The aggregated point set 182d is representative of the aggregated points sets in the list of noncausal aggregated point sets 182a and the list of causal aggregated point sets 182b.

Where the number of the aggregated points within the neighborhood 230 is greater than the upper threshold value, the controller 110 randomly removes some aggregated points 234a-234n (e.g., removed aggregated points 236a-236d) to bring the total below the upper threshold limit per the step 210 in FIG. 8. Thereafter, the aggregated point set 182a/182b is generated from the aggregated points 234a-234n within each neighborhood 230 around each location point 174.

Figure 11:
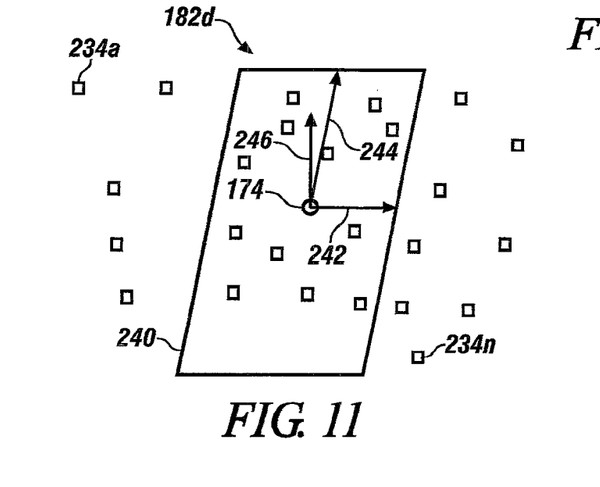
FIG. 11 is a schematic diagram of a best-fit plane in accordance with one or more exemplary embodiments.

Referring to FIG. 11, a schematic diagram of an example best-fit plane 240 is shown in accordance with one or more exemplary embodiments. The best-fit plane 240 defines a plane that is closest to fitting among the aggregated points 234a-234n. A first singular vector with a first singular value is illustrated as a vector 242. A second singular vector with a second singular value is illustrated as a vector 244. The first singular vector 242 and the second singular vector 244 define the best-fit plane 240. A third singular vector with a third singular value is illustrated as a vector 246. The third singular vector 246 is normal to the best-fit plane 240.

Embodiments of the disclosure may provide a navigation monitor (or system) 100a disposed in an ego vehicle 90a and configured to provide accurate measurements of the motion of the ego vehicle 90a suitable for use as an autonomous vehicle training database. The navigation monitor 100a includes a lidar device 102 configured to perform a plurality of scans of an environment 82 proximate the ego vehicle 90a to generate a plurality of lidar point clouds related to one or more objects 84 in the environment 82. The navigation monitor 100a includes a controller 110 configured to transform the plurality of lidar point clouds with a plurality of location transform matrices to generate a plurality of location point sets, aggregate the plurality of location point sets in a duration of interest to generate a plurality of aggregated point sets, register the plurality of location point sets to the plurality of aggregated point sets to generate a plurality of correction transform matrices, update the plurality of location transform matrices with the plurality of correction transform matrices to generate a plurality of updated location transform matrices, and generate a plurality of accurate motion sets based on the plurality of updated location transform matrices. The navigation monitor 100a includes a circuit 112 configured to receive the plurality of motion sets. The motion sets are stored in a storage device 114 for subsequent consumption as a training dataset by an autonomous driving training system 116.

All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiments.

While the best modes for carrying out the disclosure have been described in detail, those familiar with the art to which this disclosure relates will recognize various alternative designs and embodiments for practicing the disclosure within the scope of the appended claims.

What is claimed is:

1. A motion monitor comprising:
 a lidar device disposed in an ego vehicle and configured to perform a plurality of scans in a sequence over time of an environment proximate the ego vehicle to generate a plurality of lidar point clouds in the sequence related to one or more objects in the environment, wherein the sequence involves two or more scans of the plurality of scans at two or more different times;
 a controller in communication with the lidar device and configured to transform the plurality of lidar point clouds with a plurality of location transform matrices to generate a plurality of location point sets in the sequence, aggregate the plurality of location point sets in the sequence in a duration of interest that includes the two or more scans at the two or more different times to generate a plurality of aggregated point sets, register the plurality of location point sets to the plurality of aggregated point sets to generate a plurality of correction transform matrices, update the plurality of location transform matrices with the plurality of correction transform matrices to generate a plurality of updated location transform matrices in the sequence, and generate a plurality of motion sets based on the plurality of updated location transform matrices, wherein the registration of the plurality of location point sets includes:
  identification of a number of aggregated points among the plurality of aggregated point sets that are within a neighborhood proximate each current location point in the plurality of location point sets;
  removal of the neighborhood in response to the number of the aggregated points being less than a lower threshold number;
  reduction of the neighborhood to a random sample of the aggregated points within the neighborhood in response to the number of the aggregated points exceeding an upper threshold value;
  calculation of a singular value decomposition of the aggregated points in the neighborhood to determine a first singular vector, a first singular value, a second singular vector, a third singular vector, and a third singular value, where the first singular vector and the second singular vector define a best-fit plane to the aggregated points, and the third singular vector is normal to the best-fit plane; and
  filter the neighborhood in response to a ratio of the third singular value to the first singular value being greater than a ratio threshold value; and
 a circuit in communication with the controller and configured to receive the plurality of motion sets.

2. The motion monitor according to claim 1, wherein the registration of the plurality of location point sets in the sequence includes a non-causal registration that utilizes one or more future location point sets of the plurality of location point sets in the sequence to noncausally register one or more current location point sets of the plurality of location point sets in the sequence.

3. The motion monitor according to claim 1, wherein the registration of the plurality of location point sets in the sequence is a causal registration that solely utilizes past location point sets of the plurality of location point sets in the sequence to causally register each current location point set of the plurality of location point sets in the sequence.

4. The motion monitor according to claim 1, wherein the generation of the plurality of correction transform matrices is calculated using a least mean squares technique under a low angle correction assumption.

5. The motion monitor according to claim 1, wherein the circuit is a storage device configured to record the plurality of motion sets, and the plurality of motion sets form a training dataset for an autonomous driving training system.

6. The motion monitor according to claim 1, wherein the circuit is a drive system disposed in the ego vehicle, and configured to control movement of the ego vehicle in response to the plurality of motion sets.

7. The motion monitor according to claim 1, further comprising a camera configured to sense the environment proximate the ego vehicle to generate a plurality of images.

8. The motion monitor according to claim 7, wherein the plurality of location transform matrices aligns the plurality of motion sets with the plurality of images.

9. A method for motion estimation of an ego vehicle comprising:
scanning an environment proximate the ego vehicle in a plurality of scans in a sequence over time with a lidar device to generate a plurality of lidar point clouds in the sequence related to one or more objects in the environment, wherein the sequence involves two or more scans of the plurality of scans at two or more different times;
transforming the plurality of lidar point clouds with a plurality of location transform matrices to generate a plurality of location point sets in the sequence;
aggregating the plurality of location point sets in the sequence in a duration of interest that includes the two or more scans at the two or more different times to generate a plurality of aggregated point sets;
registering the plurality of location point sets to the plurality of aggregated point sets to generate a plurality of correction transform matrices, wherein the registration of the plurality of location point sets includes:
identifying a number of aggregated points among the plurality of aggregated point sets that are within a neighborhood proximate each current location point in the plurality of location point sets;
removing the neighborhood in response to the number of the aggregated points being less than a lower threshold number;
reducing the neighborhood to a random sample of the aggregated points within the neighborhood in response to the number of the aggregated points exceeding an upper threshold value;
calculating a singular value decomposition of the aggregated points in the neighborhood to determine a first singular vector, a first singular value, a second singular vector, a third singular vector, and a third singular value, where the first singular vector and the second singular vector define a best-fit plane to the aggregated points, and the third singular vector is normal to the best-fit plane; and
filtering the neighborhood in response to a ratio of the third singular value to the first singular value being greater than a ratio threshold value;
updating the plurality of location transform matrices with the plurality of correction transform matrices to generate a plurality of updated location transform matrices in the sequence;
generating a plurality of motion sets based on the plurality of updated location transform matrices; and
receiving the plurality of motion sets at a circuit.

10. The method according to claim 9, wherein the registering of each one of the plurality of location point sets in the sequence includes a noncausal registering that utilizes one or more future location point sets of the plurality of location point sets in the sequence to noncausally register one or more current location point sets of the plurality of location point sets in the sequence.

11. The method according to claim 9, wherein the registering of each one of the plurality of location point sets in the sequence includes a causal registering that solely utilizes past location point sets of the plurality of location point sets in the sequence to causally register each current location point set of the plurality of location point sets in the sequence.

12. The method according to claim 9, wherein the generation of the plurality of correction transform matrices is calculated using a least mean squares technique under a low angle correction assumption.

13. The method according to claim 9, wherein the circuit is a storage device configured to record the plurality of motion sets, and the plurality of motion sets form a training dataset for an autonomous driving training system.

14. The method according to claim 9, wherein the circuit is a drive system disposed in the ego vehicle, and configured to control movement of the ego vehicle in response to the plurality of motion sets.

15. An ego vehicle comprising:
a lidar device configured to perform a plurality of scans in a sequence over time of an environment proximate the ego vehicle to generate a plurality of lidar point clouds in the sequence related to one or more objects in the environment, wherein the sequence involves two or more scans of the plurality of scans at two or more different times;
a controller in communication with the lidar device and configured to transform the plurality of lidar point clouds with a plurality of location transform matrices to generate a plurality of location point sets in the sequence, aggregate the plurality of location point sets in the sequence in a duration of interest that includes the two or more scans at the two or more different times to generate a plurality of aggregated point sets, register the plurality of location point sets to the plurality of aggregated point sets to generate a plurality of correction transform matrices, update the plurality of location transform matrices with the plurality of correction transform matrices to generate a plurality of updated location transform matrices in the sequence, and generate a plurality of motion sets based on the plurality of updated location transform matrices, wherein the registration of the plurality of location point sets includes:
identifying a number of aggregated points among the plurality of aggregated point sets that are within a neighborhood proximate each current location point in the plurality of location point sets;
removing the neighborhood in response to the number of the aggregated points being less than a lower threshold number;
reducing the neighborhood to a random sample of the aggregated points within the neighborhood in response to the number of the aggregated points exceeding an upper threshold value;
calculating a singular value decomposition of the aggregated points in the neighborhood to determine a first singular vector, a first singular value, a second singular vector, a third singular vector, and a third singular value, where the first singular vector and the second singular vector define a best-fit plane to the aggregated points, and the third singular vector is normal to the best-fit plane; and filtering the neighborhood in response to a ratio of the third singular value to the first singular value being greater than a ratio threshold value;

a circuit in communication with the controller and configured to receive the plurality of motion sets and generate a plurality of commands in response to the plurality of motion sets; and a drive system configured to control movement of the ego vehicle in response to the plurality of commands.

16. The ego vehicle according to claim 15, wherein the registering of the plurality of location point sets in the sequence is a causal registering that solely utilizes past location point sets of the plurality of location point sets in the sequence to causally register each current location point set of the plurality of location point sets in the sequence.

17. The ego vehicle according to claim 15, further comprising a camera configured to sense the environment proximate the ego vehicle to generate a plurality of images.

18. The ego vehicle according to claim 17, wherein the plurality of location transform matrices aligns the plurality of motion sets with the plurality of images.

19. The ego vehicle according to claim 15, wherein the registration of the plurality of location point sets in the sequence includes a non-causal registration that utilizes one or more future location point sets of the plurality of location point sets in the sequence to noncausally register one or more current location point sets of the plurality of location point sets in the sequence.

20. The ego vehicle according to claim 15, wherein the generation of the plurality of correction transform matrices is calculated using a least mean squares technique under a low angle correction assumption.

* * * * *